(12) United States Patent
Hwang et al.

(10) Patent No.: US 8,859,458 B2
(45) Date of Patent: Oct. 14, 2014

(54) METHODS OF PREPARING ELECTROCATALYSTS FOR FUEL CELLS IN CORE-SHELL STRUCTURE AND ELECTROCATALYSTS

(75) Inventors: Seung Jun Hwang, Seoul (KR); Sung Jong Yoo, Incheon (KR); Soo Kil Kim, Seoul (KR); Eun Ae Cho, Seoul (KR); Jong Hyun Jang, Gyeonggi-Do (KR); Hyoung Juhn Kim, Gyeonggi-Do (KR); Suk Woo Nam, Seoul (KR); Tae Hoon Lim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 259 days.

(21) Appl. No.: 13/238,064

(22) Filed: Sep. 21, 2011

(65) Prior Publication Data
US 2012/0135862 A1    May 31, 2012

(30) Foreign Application Priority Data

Nov. 30, 2010  (KR) .................. 10-2010-0120913

(51) Int. Cl.
*B01J 21/00* (2006.01)
*B01J 21/04* (2006.01)
(Continued)

(52) U.S. Cl.
CPC .................. *B82Y 30/00* (2013.01); *Y02E 60/50* (2013.01); *B82Y 40/00* (2013.01); *H01M 4/925* (2013.01); *H01M 4/8657* (2013.01); *Y10S 977/773* (2013.01); *Y10S 977/775* (2013.01); *Y10S 977/81* (2013.01)
USPC ........... 502/339; 502/182; 502/184; 502/185; 502/240; 502/243; 502/244; 502/245; 502/261; 502/262; 502/300; 502/326; 502/330; 502/331; 502/332; 502/333; 502/334; 502/335; 502/336; 502/337; 502/338; 502/344; 502/345; 502/346; 502/439; 429/487; 429/524; 429/525; 429/528; 429/532; 977/773; 977/775; 977/810

(58) Field of Classification Search
CPC ............ B01J 23/40; B01J 23/42; B01J 23/44; B01J 23/468; B01J 23/52; B01J 23/72; B01J 35/02; B01J 37/02; B01J 37/16; H01M 4/9058; H01M 4/9075; H01M 4/925; B82Y 30/00
USPC ......... 502/240, 243–245, 261–262, 300, 326, 502/330–338, 339, 344–346, 439, 182, 184, 502/185; 429/487, 524, 525, 528, 532; 977/773, 775, 810
See application file for complete search history.

(56) References Cited

U.S. PATENT DOCUMENTS 7,335,245 B2 *   2/2008  He et al. .......................... 75/351
2009/0053512 A1 *   2/2009  Pyun et al. .................... 428/336
(Continued)

OTHER PUBLICATIONS

Deli Wang, et al; "Pt-Decorated PdCo@Pd/C Core-Shell Nanoparticles with Enhanced Stability and Electrocatalytic Activity for the Oxygen Reduction Reaction", Journal of the American Chemical Society, vol. 132, pp. 17664-17666; Published on Web Nov. 24, 2010.

*Primary Examiner* — Cam N. Nguyen
(74) *Attorney, Agent, or Firm* — Ladas & Parry LLP

(57) ABSTRACT

Provided are a method of preparing an electrocatalyst for fuel cells in a core-shell structure, an electrocatalyst for fuel cells having a core-shell structure, and a fuel cell including the electrocatalyst for fuel cells. The method may be useful in forming a core and a shell layer without performing a subsequent process such as chemical treatment or heat treatment and forming a core support in which core particles having a nanosize diameter are homogeneously supported, followed by selectively forming shell layers on surfaces of the core particles in the support. Also, the electrocatalyst for fuel cells has a high catalyst-supporting amount and excellent catalyst activity and electrochemical property.

19 Claims, 11 Drawing Sheets

(51) Int. Cl.

| | | |
|---|---|---|
| *B01J 21/18* | (2006.01) | |
| *B01J 23/00* | (2006.01) | |
| *B01J 23/02* | (2006.01) | |
| *B01J 23/04* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 23/70* | (2006.01) | |
| *B01J 23/72* | (2006.01) | |
| *B01J 23/74* | (2006.01) | |
| *H01M 4/02* | (2006.01) | |
| *H01M 4/36* | (2006.01) | |
| *H01M 4/62* | (2006.01) | |
| *H01M 4/92* | (2006.01) | |
| *H01M 4/94* | (2006.01) | |
| *H01M 8/10* | (2006.01) | |
| *B82Y 40/00* | (2011.01) | |
| *B82Y 30/00* | (2011.01) | |
| *H01M 4/86* | (2006.01) | |

(56) References Cited

U.S. PATENT DOCUMENTS

2010/0055170 A1* 3/2010 Lee .............................. 424/451
2011/0124499 A1* 5/2011 Fang et al. .................... 502/326

* cited by examiner

METHODS OF PREPARING ELECTROCATALYSTS FOR FUEL CELLS IN CORE-SHELL STRUCTURE AND ELECTROCATALYSTS

CROSS-REFERENCE TO RELATED APPLICATION

This application claims priority to and the benefit of Korean Patent Application No. 2010-0120913, filed on Nov. 30, 2010, the disclosure of which is incorporated herein by reference in its entirety.

BACKGROUND

1. Field of the Invention

The present invention relates to methods of preparing electrocatalysts for fuel cells in a core-shell structure, and electrocatalysts.

2. Discussion of Related Art

A fuel cell is an apparatus that generates electric energy through electrochemical reaction of fuel and an oxidant. The fuel cell uses hydrogen as the fuel and oxygen as the oxidant, and an electrode includes an anode for catalyzing an oxidation reaction by hydrogen and a cathode for catalyzing a reduction reaction by oxygen. In the fuel cell, the electrode is referred to as an electrocatalyst since such catalytic actions are performed in the fuel cell. The electrocatalyst is prepared using a method of supporting particles, which serve to perform the catalytic actions, in a support such as carbon.

A catalyst material commonly used as the electrocatalyst of the fuel cell is platinum. However, platinum has a problem in that it is very expensive and should have a minimum permissible content of impurities. Therefore, much research has been conducted on preparing and using an electrocatalyst capable of reducing an amount of used platinum and giving more excellent electrochemical activity and stability than that using pure platinum. Such research has been conducted to improve the activity of platinum itself or propose an electrocatalyst formed of an alloy of platinum and a transition metal. In recent years, increasing attention has been paid to electrocatalysts that are proposed to have a core-shell structure due to particularly high electrochemical activity and stability.

However, it is difficult to prepare uniform core particles having a nanosize diameter in a process of preparing an electrocatalyst having a core-shell structure, and a key point is to homogeneously form a shell layer on a surface of each generated core particle. In particular, when the core particles are first supported in a support and shell layers are then formed, the shell layers are not only selectively formed on surfaces of the core particles, but also formed on a surface of the support. As a result, various performances may be degraded. Accordingly, an electrocatalyst having a core-shell structure may be prepared by forming nanosize core particles, coating shell particles on the core particles to prepare catalyst particles having a core-shell structure, and supporting the catalyst particles in a support. In this method, supporting the catalyst particles in the support is achieved through a physical bond between the catalyst particles and the support. Therefore, the bonding force between the support and the catalyst particles is not so strong. On the other hand, when the core particles can be directly supported in the support, a chemical bond between the support and the core particles is formed. Therefore, it is possible to support the core particles in the support with a stronger bonding force. Also, it is possible to support a much larger amount of particles.

Meanwhile, a stabilizer or a dispersing agent has been used to achieve uniformity of core particles and form a uniform shell layer during formation of a core-shell structure. Such a stabilizer affects the reactivity of a catalyst and is an obstacle to forming shell layers on surfaces of the core particles. Therefore, the stabilizer should be removed through chemical treatment or heat treatment. However, the core particles formed during such chemical treatment or heat treatment may cohere to each other, and may be deformed. Also in the case of the shell layers, the activity of the electrocatalyst may be degraded due to the cohesion of particles or the collapse of shell layers.

SUMMARY OF THE INVENTION

The present invention is directed to a method of preparing electrocatalysts capable of forming an electrocatalyst having a core-shell structure without performing a chemical treatment or heat treatment process.

Also, the present invention is directed to a method of preparing electrocatalysts capable of uniformly forming core particles and selectively forming shell layers.

In addition, the present invention is directed to an electrocatalyst for fuel cells, which has a high catalyst-supporting amount and excellent catalyst activity. Furthermore, the present invention is directed to a fuel cell including the electrocatalyst, which has an excellent electrochemical property.

According to an aspect of the present invention, there is provided a method of preparing an electrocatalyst for fuel cells. Here, the method includes preparing a core support in which core particles having a nanosize diameter are supported through a reaction of a support and a metal for forming a core in an ether-based solvent, and selectively forming shell layers on surfaces of the core particles through a reaction of the core support and a metal for forming a shell layer in the presence of an ester-based reducing agent.

In the preparation of the core support, an amine-based reducing agent may be further used.

The metal for forming a core may be at least one selected from the group consisting of palladium, copper, gold and iridium.

The metal for forming a shell layer may be at least one selected from the group consisting of platinum, gold and iridium.

The ether-based solvent used in the preparation of the core support may be benzyl ether.

The ester-based reducing agent used in the preparation of the core support may be Hanztsch ester or a derivative thereof.

According to another aspect of the present invention, there is provided a core support prepared through a reaction of a support and a metal for forming a core in an ether-based solvent, wherein core particles having a nanosize diameter are supported in the support.

The metal for forming a core may be at least one selected from the group consisting of palladium, copper, gold and iridium.

The ether-based solvent may be benzyl ether.

According to still another aspect of the present invention, there is provided an electrocatalyst for fuel cells including core particles having a nanosize diameter, a core support supported by the core particles, and shell layers selectively formed on surfaces of the core particles through a reaction of the core support and a metal for forming a shell layer in the presence of Hanztsch ester or a derivative thereof.

The metal for forming a core may be at least one selected from the group consisting of palladium, copper, gold and iridium.

The metal for forming a shell layer may be at least one selected from the group consisting of platinum, gold and iridium.

According to still another aspect of the present invention, there is provided an electrocatalyst for fuel cells including a support, core particles supported in the support and having a nanosize diameter, and shell layers formed by selectively coating surfaces of the core particles.

According to yet another aspect of the present invention, there is provided a fuel cell including an electrocatalyst for fuel cells, wherein the electrocatalyst is used as at least one of a cathode and an anode.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 4A and 4B are TEM photographs of catalysts prepared in Comparative Example 2 and Example 2-1a.

DETAILED DESCRIPTION OF EXEMPLARY EMBODIMENTS

Figure 1A:
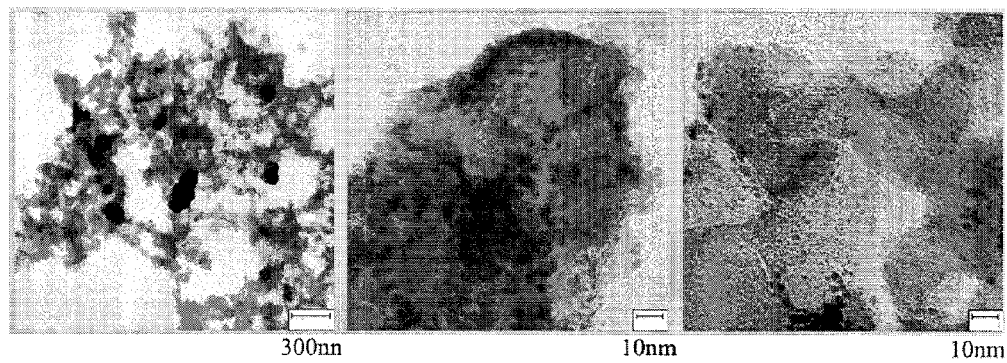
FIGS. 1A to 1F are transmission electron microscopy (TEM) photographs of core supports prepared in Comparative Examples 1-1 to 1-6.

Exemplary embodiments of the present invention will be described in detail below with reference to the accompanying drawings. While the present invention is shown and described in connection with exemplary embodiments thereof, it will be apparent to those skilled in the art that various modifications can be made without departing from the scope of the invention.

The present invention provides a method of preparing an electrocatalyst for fuel cells in which a catalyst having a core-shell structure is supported in a support. Here, the method of preparing the electrocatalyst for fuel cells includes forming a core support through a reaction of the support and a precursor of a metal for forming a core in an ether-based solvent so as to homogeneously support the core metal through out the support in the form of nanoparticles and then forming shell layers through reacting the support and the precursor of metal for coating the core particles in the presence of an ester-based reducing agent so as to selectively and homogeneously coat surfaces of the core particles in the support with a metal for forming a shell layer.

The present inventors have found that, in the preparation of an electrocatalyst having a core-shell structure, core nanoparticles having a uniform particle size may be homogeneously supported through out a support by a reaction of the support and a precursor of a metal for forming a core in an ether-based solvent without using a stabilizer in a core-forming reaction, and provided a method of preparing an electrocatalyst for fuel cells. In this case, shell layers may be selectively formed only on surfaces of the core particles having a nanosize diameter when an ester-based reducing agent is used in a shell layer-forming reaction of forming a shell layer on the support in which the core particles are homogeneously supported.

According to the present invention, a subsequent process (i.e., heat treatment or chemical treatment) is not required to remove a stabilizer during the preparation of a core support which is prepared by directly supporting core particles through out the support during the formation of the core. The present invention provides electrocatalyst comprising a support and a catalyst component in a core-shell structure which includes core particles with nano-sized diameters homogeneously supported through out the support and shell layers formed on surface of the core particles. Therefore, the electrocatalyst is characterized in a high catalyst-supporting amount, excellent catalyst activity and electrochemical property.

During the preparation of a conventional electrocatalyst having a core-shell structure, a stabilizer such as oleylamine or cetyltrimethylammonium bromide (CTAB) may be used in a core-forming reaction. This is because, when using the stabilizer, dispersion may be easily performed, and a reduction reaction of a metal may stably occur as the stabilizer surrounds a surface of the metal for forming a core. Therefore, it is possible to form core particles having a uniform particle size when using the stabilizer. However, the stabilizer remains on the surfaces of the core particles formed in the presence of the stabilizer, and then interferes with formation of a shell layer. Therefore, in order to remove the stabilizer from the surfaces of the core particles after the formation of the core particles, it is necessary to perform a subsequent process such as chemical treatment or heat treatment using acetic acid, hydrazine, TEAOH, TMAOH, KCN or a compound having a short amine chain. However, cohesion between particles or changes in shape of the particles may be caused during the subsequent process (see FIGS. 2A to 2C). Accordingly, when the stabilizer is used, the core particles may be substantially uniformly formed (monodispersion of a core material). When the core particle is not uniformly formed, shell layers may not be homogeneously formed on the surfaces of the core particles. Therefore, the final electrocatalyst does not express satisfactory performances in an aspect of a catalyst-supporting amount, catalyst activity and an electrochemical property.

In the present invention, the nanosize core particles may be homogeneously supported in the support even when a stabilizer is not used in a core-forming process. This is advantageous in processes since a conventional subsequent procedure for removal of a stabilizer, which accompanies the use of the stabilizer, may be omitted, and may maintain intact a shape of the core particles supported in the support.

The core-forming reaction according to one exemplary embodiment of the present invention is characterized in that a nanosize core having a uniform particle size may be formed without using a stabilizer by using an ether-based solvent instead of an alcoholic solvent. This is considered to be possible because the ether-based solvent used as the solvent serves as a kind of stabilizer in the support-forming reaction to slowly reduce a metal precursor. Since the ether solvent may be easily removed only by ethanol washing, compared to stabilizers widely used in the art, and has a short carbon chain, it is considered not to affect subsequent reactions even when the ether solvent is not particularly removed.

Further, in the present invention, it is confirmed that the core particles may be formed by reaction of the metal precursor even when the core particles are supported in the support at room temperature as described above (in the case of the following Example 1-3).

Benzyl ether (Formula 1), phenyl ether, dimethoxytetraglycol (Formula 2) or furan-based aromatic ether may be used as the ether-based solvent used in the present invention, but the present invention is not limited thereto.

Formula 1

Benzylether

Formula 2

Dimethoxytetraglycol

As the core metal which is supported through out the support in the form of nanoparticles, ruthenium, rhodium, palladium, gold, silver, iridium, copper, nickel, iron, osmium, platinum, or an alloy of at least two thereof may be used. Preferably, at least one metal selected from the group consisting of palladium, copper and iridium, or an alloy thereof is used. A carbon support such as activated carbon or carbon black is preferably used as the support. Also, metal acetylacetonate, a platinum-based compound such as $PtCl_4$, $H_2PtCl_6 \cdot 6H_2O$, $PtCl_2(C_6H_5CN)_2$, $Pt(CH_3COCHCOCH_3)_2$, $K_2PtCl_6$; or an iridium-based compound such as $IrCl_3$, $H_2IrCl_6 \cdot XH_2O$, $IrCl_3 \cdot XH_2O$, $Ir(CH_3COCHCOCH_3)_3$, $K_2IrCl_6$ may be used as the metal precursor for forming the core particles through out the support.

Meanwhile, a reducing agent may be further used in the core-forming reaction according to one exemplary embodiment of the present invention. In this case, an ammonia borane-based reducing agent such as t-butylamine borane may be used as the reducing agent to improve reaction efficiency.

Next, the reaction of forming a shell layer on a core support is characterized in that a metal precursor for forming a shell is reduced with an ester-based reducing agent to selectively form uniform shell layers on surfaces of the core particles in the support.

In the present invention, a selective shell layer-forming reaction may be performed by reducing a metal for forming a shell layer using a Hanztsch ester (Formula 3) or a derivative thereof as the reducing agent. In this case, the Hanztsch ester is known to be widely used for slow transfer hydrogenation in an organic chemical reaction as represented by the following Scheme 1.

Scheme 1

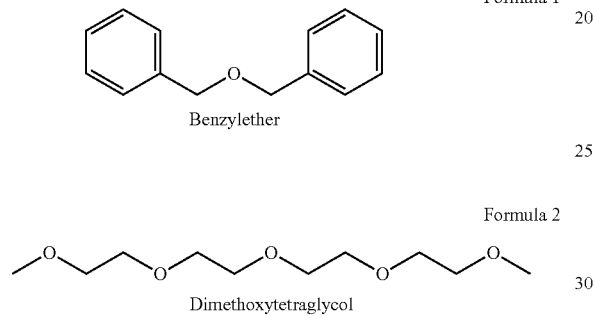

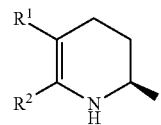

10 examples
47-84% yield
84-92% ee

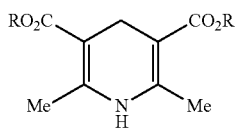

Formula 3 wherein, R is alkyl having 1 to 4 carbon atoms.

The Hanztsch ester reduces the metal precursor for forming a shell layer much more slowly, compared to a polyol method used in the art to form a shell layer, a reduction method using an acid such as ascorbic acid or citric acid, or a reduction method using a reducing agent such as $NaBH_4$, thereby selectively forming shell layers only on surfaces of the core particles.

In the conventional process of forming a shell layer, particles of the metal for forming a shell layer are coated on the surface of the support, as well as the surfaces of the core particles. In the present invention, however, it is confirmed that the shell layers are selectively and homogeneously formed on the surfaces of the core particles (see FIG. 4B). The shell layers are considered to be selectively and homogeneously formed only on the surfaces of the core particles since the ester-based reducing agent used as the reducing agent contributes to a slow reduction reaction of the metal precursor.

Also, the slow transfer hydrogenation of Hanztsch ester or a derivative thereof in the shell layer-forming reaction does not need the use of the stabilizer used in the art as previously described in the core-forming reaction, and also does not require a subsequent process to remove the stabilizer from surfaces of the shell layers after the formation of the shell layers.

When a stabilizer is used in the conventional shell layer-forming reaction, the stabilizer remains on a surface of the finished core-shell structure, thereby degrading catalytic activity and electrochemical properties. Therefore, heat treatment or chemical treatment should be performed to remove the stabilizer, as described above. However, since the finished core-shell structure is deformed during the subsequent process, the catalytic activity and electrochemical properties may be accordingly degraded. In the present invention, since the stabilizer is not used in the shell layer-forming reaction, this is advantageous in processes since a subsequent procedure may be omitted, and it is possible to prevent deformation of the core-shell structure caused during the subsequent process and thus degradation of the catalytic activity and electrochemical properties.

As the metal used to form a shell layer, ruthenium, rhodium, palladium, gold, silver, iridium, copper, nickel, iron, osmium, platinum, or an alloy of at least two thereof may be used in addition to the metal for foaming a core. Preferably, platinum, iridium, gold or an alloy thereof is used. Metal acetylacetonate, a platinum-based compound such as $PtCl_4$, $H_2PtCl_6 \cdot 6H_2O$, $PtCl_2(C_6H_5CN)_2$, $Pt(CH_3COCHCOCH_3)_2$, $K_2PtCl_6$; an iridium-based compound such as $IrCl_3$, $H_2IrCl_6 \cdot XH_2O$, $IrCl_3 \cdot XH_2O$, $Ir(CH_3COCHCOCH_3)_3$, $K_2IrCl_6$; or a gold-based compound such as $HAuCl_4 \cdot 3H_2O$ may be used as the metal precursor.

The electrocatalyst according to the present invention prepared in such a method is prepared by homogeneously forming core particles (monodispersion of a core material) to form a core support supported by the core particles and homogeneously supporting a catalyst having a core-shell structure in the support by selectively and homogeneously coating shell layers on surfaces of the core particles. Such an electrocatalyst may be used for both a cathode and an anode of a fuel cell. That is, a catalyst for the hydrogen oxidation reaction or oxygen reduction reaction may be used for the fuel cells, depending on a kind of selected catalyst materials. For example, when palladium or a palladium alloy is used for the core and platinum is used for the shell layer, the platinum serves to perform a catalytic action in the oxygen reduction reaction. Also, when iridium is used for the shell layer, the iridium serves to perform a catalytic action in the hydrogen oxidation reaction.

In the preparation of the electrocatalyst according to the present invention, ruthenium, rhodium, palladium, gold, silver, iridium, copper, iron, nickel, osmium, platinum or an alloy of at least two thereof may be used as the metal for forming a core or shell. However, palladium or palladium and an alloy with other metals is preferably used as the metal for forming a core. Metals that may be used herein as the metal for forming an alloy with palladium include various kinds of metals such as copper (Cu), nickel (Ni), iridium (Ir), molybdenum (Mo), indium (In), rhodium (Rh), rhenium (Re), cobalt (Co) and iron (Fe). In particular, when an alloy of palladium and copper is used, a core having excellent properties may be formed even when a reaction is performed at room temperature.

The features of the present invention are based on the fact that a method of directly supporting core particles in a support in formation of a core is used to prepare a catalyst support having a core-shell structure. After the preparation of the catalyst having a core-shell structure is completed, when a method of supporting core particles in a support is compared to a method of directly supporting core particles in a support during formation of a core, it is apparent that the present invention is more advantageous in an aspect of a catalyst-supporting amount and stability from the fact that bonding between the support and the catalyst particles of the finished core-shell structure is formed by a physical bond and bonding between the support and the core particles is formed by a chemical bond. In the present invention, it is possible to support the core particles in the support during the formation of a core. This is because shell layers may be selectively formed on surfaces of the core particles in a subsequent shell layer-forming process.

That is to say, since the prior art has a problem in that particles of the metal for forming a shell layer are secured on a surface of the support, as well as the surfaces of the core particles supported in the support, catalyst particles having a core-shell structure are completely prepared, and then supported in a support. In this case, a chemical bond between the catalyst particles and the support is formed, which is more problematic. As a result, the problem is that the particles of the metal for forming a shell layer are more often secured on the surface of the support rather than the surfaces of the core particles during the formation of the shell layer. Therefore, a method that includes completing preparation of a catalyst having a core-shell structure and supporting the catalyst in a support has been used to solve this problem. In the present invention, however, since the shell layer is selectively formed on the surfaces of the core particles, a reaction of first supporting the core particles themselves in the support and then forming shell layers on surfaces of the core particles supported in the support may be performed during the formation of the core particles.

Hereinafter, the present invention will be described with reference to the following Examples.

[Preparation of Core Support—Use of Stabilizer]

COMPARATIVE EXAMPLE 1-1(Pd/C)

In order to prepare a core support, carbon Vulcan-XC 72R 150 mg was used as a support, and palladium acetylacetonate ($Pd(acac)_2$) 182.8 mg, which is a precursor of a metal for forming a core, $NaBH_4$ 152 mg, which is a reducing agent, and oleylamine 197 µL, which is a stabilizer, were reacted in a solvent 1,2-propanediol 100 mL. The resulting reaction mixture was reacted at room temperature for 10 hours. A TEM photograph of the prepared core support was taken (FIG. 1A).

COMPARATIVE EXAMPLE 1-2 (Pd/C)

Figure 1B:
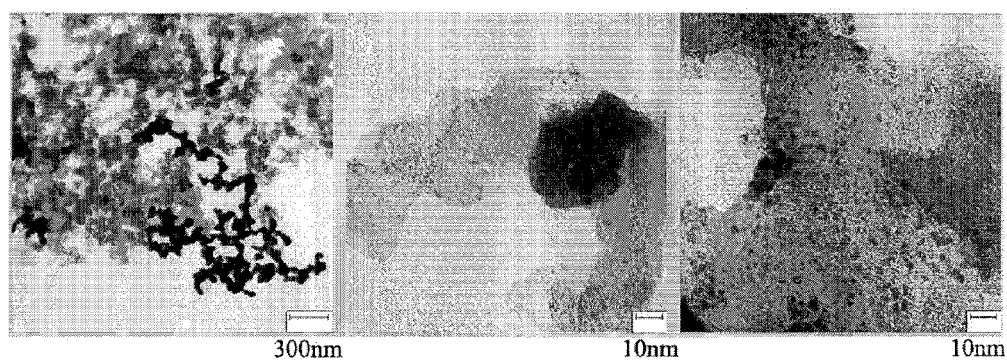

A core support was prepared in the same manner as in Comparative Example 1-1, except that t-butylamine borane 600 mg was used as the reducing agent instead of $NaBH_4$, and the reaction was performed at a temperature of 95° C. A TEM photograph of the prepared core support was taken (FIG. 1B).

COMPARATIVE EXAMPLE 1-3 (Pd/C)

Figure 1C:
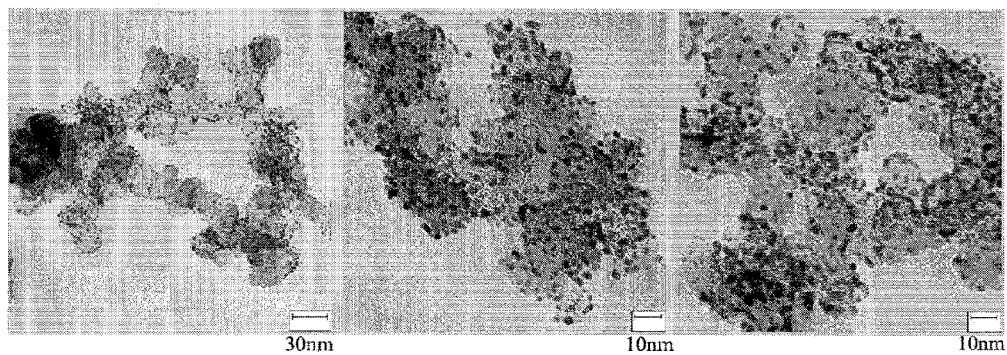

In order to prepare a core support, carbon Vulcan-XC 72R 100 mg was used as a support, palladium acetylacetonate ($Pd(acac)_2$) 121.9 mg, which is a precursor of a metal for forming a core, t-butylamine borane 600 mg, which is a reducing agent, and oleylamine 1 mL, which is a stabilizer, were reacted in a solvent benzyl ether 100 mL. The resulting reaction mixture was reacted at room temperature for 10 hours. A TEM photograph of the prepared core support was taken (FIG. 1C).

COMPARATIVE EXAMPLE 1-4 ($Pd_3Ni_1$/C)

Figure 1D:
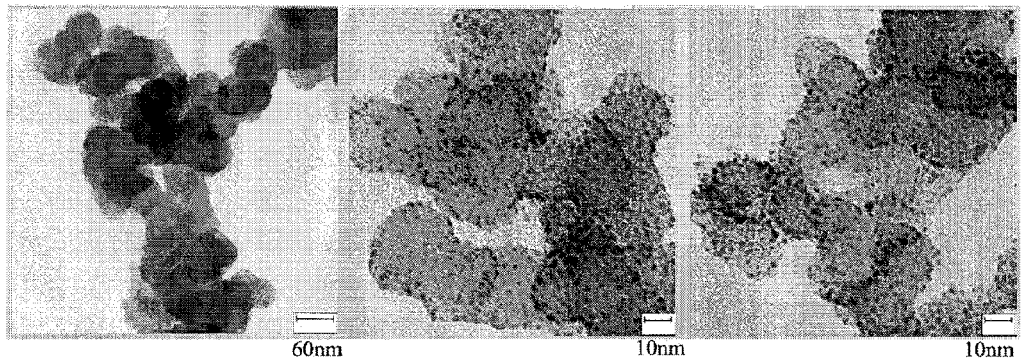

A core support was prepared in the same manner as in Comparative Example 1-3, except that palladium acetylacetonate ($Pd(acac)_2$) 106.5 mg and nickel acetyl acetonate ($Ni(acac)_2$) 29.8 mg were used as the precursors of the metal for forming a core. A TEM photograph of the prepared core support was taken (FIG. 1D).

COMPARATIVE EXAMPLE 1-5 ($Pd_4Ir_6$/C)

Figure 1E:
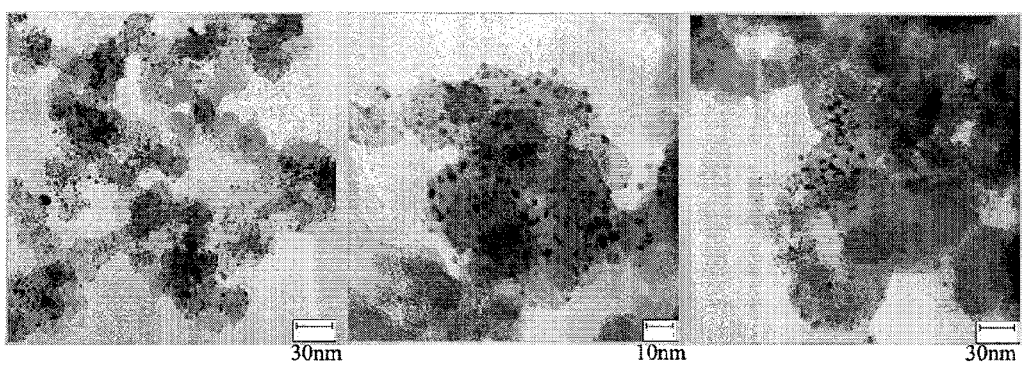

A core support was prepared in the same manner as in Comparative Example 1-3, except that palladium acetylacetonate ($Pd(acac)_2$) 33.5 mg and iridium acetyl acetonate ($Ir(acac)_3$) 82.4 mg were used as the precursors of the metal for forming a core, and the reaction was performed at a temperature of 95° C. A TEM photograph of the prepared core support was taken (FIG. 1E).

COMPARATIVE EXAMPLE 1-6 ($Pd_4Ir_6$/C)

Figure 1F:
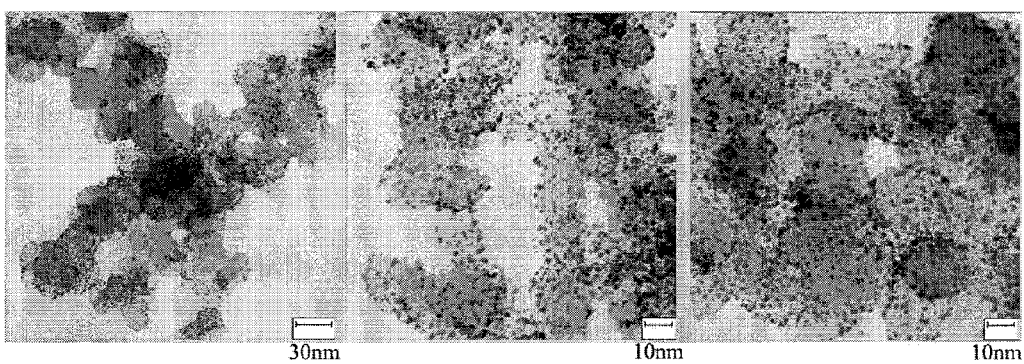

A core support was prepared in the same manner as in Comparative Example 1-3, except that palladium acetylacetonate ($Pd(acac)_2$) 50.2 mg and iridium chloride ($IrCl_3$) 80.2 mg were used as the precursors of the metal for forming a core, and the reaction was performed at a temperature of 95° C. A TEM photograph of the prepared core support was taken (FIG. 1F).

[Chemical Treatment for Removal of Stabilizer]

Figure 2A:
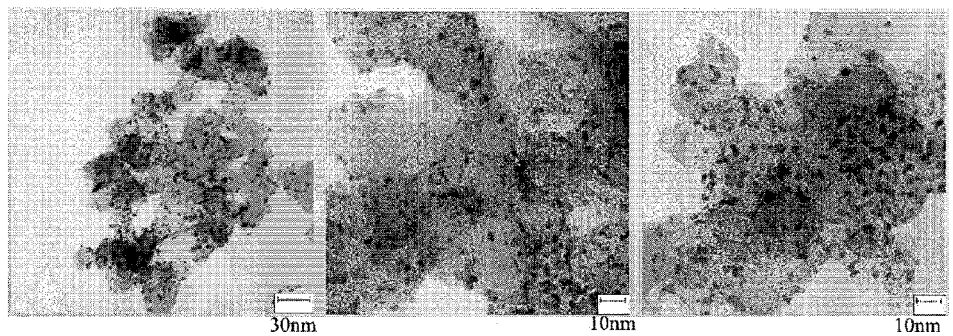
FIGS. 2A to 2C are TEM photographs showing the results obtained by preparing a core support and chemically treating the core support with acetic acid (AcOH), hydrazine and KCN, respectively.
Figure 2B:
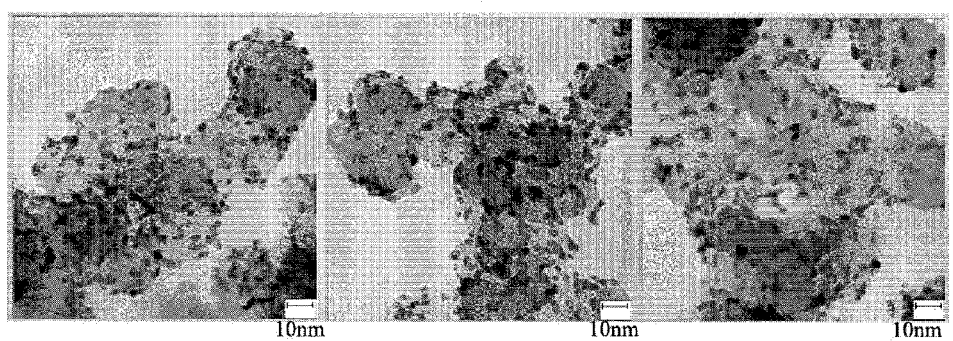
Figure 2C:
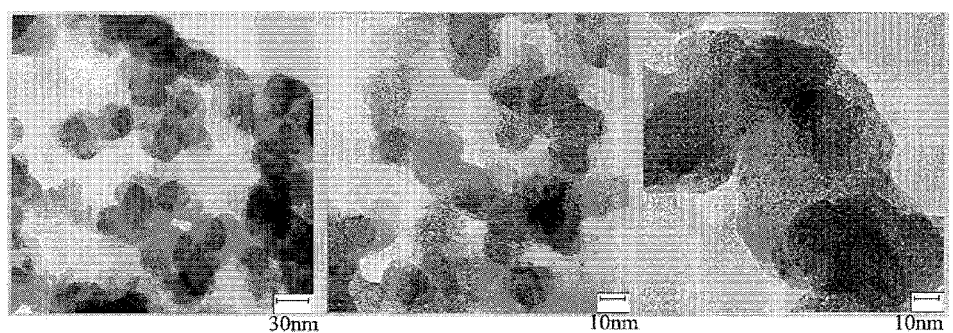

The core supports prepared in Comparative Examples were treated with acetic acid at 70° C., and then treated with hydrazine and KCN at room temperature. The results of the core supports are shown in FIGS. 2A to 2C, respectively.

[Preparation of Core Support—No Use of Stabilizer]

EXAMPLE 1-1 (Pd/C)

Figure 3A:
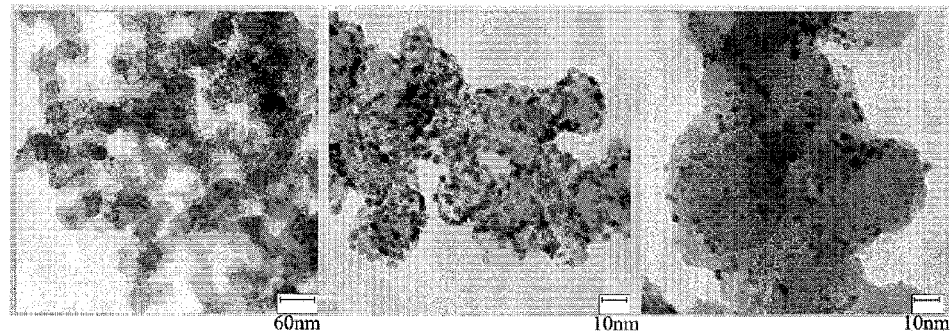
FIGS. 3A to 3C are TEM photographs of core supports prepared in Examples 1-1 to 1-3.

Carbon Vulcan-XC 72R was used as a support, and palladium acetylacetonate ($Pd(acac)_2$) 121.9 mg, which is a precursor of a metal for forming a core, and t-butylamine borane 600 mg, which is a reducing agent, were reacted in a solvent benzyl ether 100 mL. The resulting reaction mixture was reacted at room temperature for 10 hours. A TEM photograph of the prepared core support was taken (FIG. 3A).

EXAMPLE 1-2 (Pd/C)

Figure 3B:
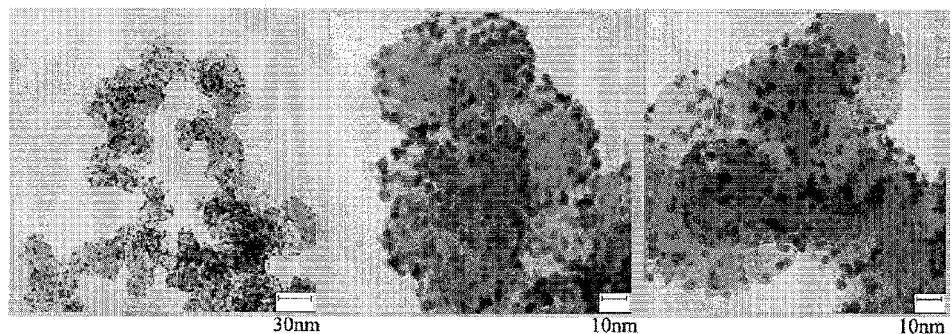

A core support was prepared in the same manner as in Example 1-1, except that the reaction was performed at a temperature of 100° C. A TEM photograph of the prepared core support was taken (FIG. 3B).

EXAMPLE 1-3 ($Pd_3Cu_1$/C)

Figure 3C:
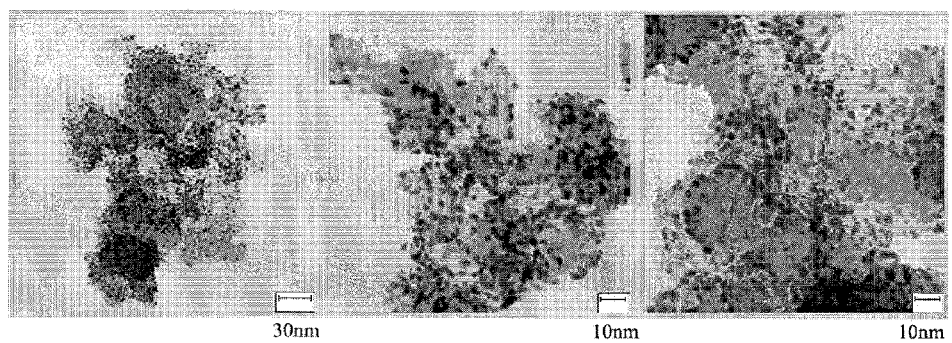

A core support was prepared in the same manner as in Example 1-1, except that palladium acetylacetonate ($Pd(acac)_2$) 119.4 mg and copper acetylacetonate ($Cu(acac)_2$) 34.2 mg were used as the precursors of the metal for forming a core. A TEM photograph of the prepared core support was taken (FIG. 3C).

When the TEM photographs of the core supports prepared in Comparative Examples and Examples were compared to one another, it was seen that the core particles having a nanosize diameter were not suitably formed in the case of Comparative Examples 1-1 and 1-2 in which the diol was used as the solvent. Meanwhile, it was revealed that the core particles having a nanosize diameter were formed and had excellent uniformity in the case of Comparative Examples 1-3 to 1-6 in which the benzyl ether was used as the solvent. However, it was seen that the reduction of $1r$ was not suitably performed even at a high temperature (95° C.) when the $Ir(acac)_3$ was used as the precursor of iridium in the case of Comparative Example 1-5. Meanwhile, it was seen that nanoparticles having a uniform particle size were again formed when the $IrCl_3$ was used. Therefore, the use of the benzyl ether solvent is advantageous for uniform formation of the nanosize core particles. In addition, it was confirmed that there is a kind of metal precursor capable of forming more excellent core particles when using the ether solvent.

Next, when the stabilizer was not used in Examples of the present invention, it was confirmed that the nanosize core particles were not well formed. However, when the stabilizer was not used (Example 1-1), the degree of dispersion and catalyst-supporting amount were low under the same conditions, compared to when the stabilizer was used (Comparative Example 1-3). However, it was confirmed that the degree of dispersion was improved and the catalyst-supporting amount was increased in Example 1-2 as the reaction temperature was increased. Meanwhile, when a core was formed of an alloy of palladium and copper, the core including nanoparticles having an excellent degree of dispersion and catalyst-supporting amount was formed even when the reaction was performed at room temperature. From these facts, it was revealed that when the ether-based solvent was used as previously described in the present invention, the core support having an excellent catalyst-supporting amount was formed in the form of uniform nanoparticles at room temperature without using the stabilizer.

[Formation of Shell Layer—Preparation of Catalyst]

COMPARATIVE EXAMPLE 2 (Pd$_3$Cu$_1$@Pt/C)

Figure 4A:
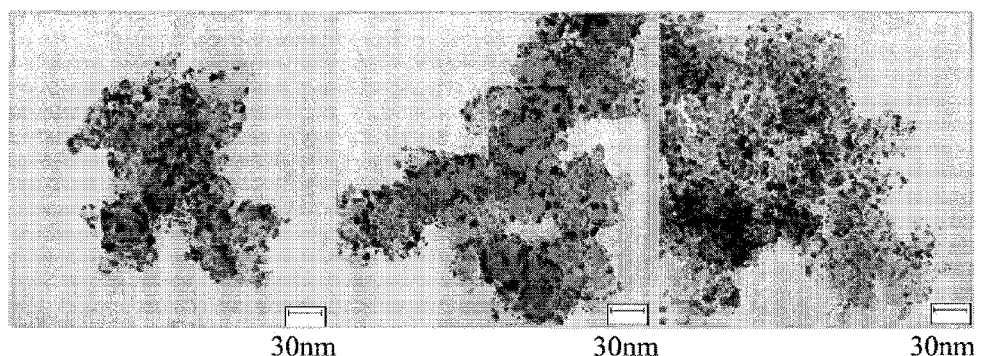

A catalyst was prepared by forming shell layers from 124.3 mg (1.5 eq of a core) of hexachloroplatinic acid (H$_2$PtCl$_6$.6H$_2$O, alfa aesar), which was dissolved as a precursor of a metal for forming a shell in 50 ml of absolute ethanol, in a solution obtained by sufficiently dispersing 50 mg of the core support prepared in Example 1-3 in 150 ml of absolute ethanol. Ascorbic acid (211.3 mg, 5 eq of a Pt precursor) dissolved in 20 ml of absolute ethanol was used as a reducing agent. The reaction was performed at a temperature of 80° C. for 2 hours. A TEM photograph of the prepared catalyst was taken (FIG. 4A).

EXAMPLE 2-1a (Pd$_3$Cu$_1$@Pt/C (1.5 eq of Pt))

Figure 4B:
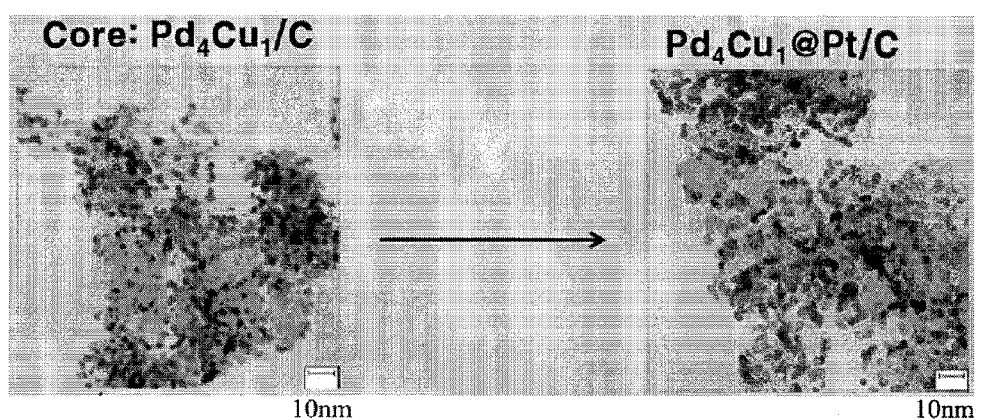

A catalyst was prepared by forming shell layers from 124.3 mg (1.5 eq of a core) of hexachloroplatinic acid (H$_2$PtCl$_6$.6H$_2$O, alfa aesar), which was dissolved as a precursor of a metal for forming a shell in 50 ml of absolute ethanol, in a solution obtained by sufficiently dispersing 50 mg of the core support prepared in Example 1-3 in 150 ml of absolute ethanol. Hanztsch ester (5 eq of a Pt precursor, 1.2 mmol) (Formula 4) dissolved in 200 ml of absolute ethanol was used as the reducing agent. The reaction was performed at a temperature of 80° C. for 2 hours. A TEM photograph of the prepared catalyst was taken (FIG. 4B).

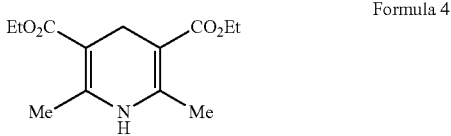 [SMILES: CCOC(=O)C1=C(C)NC(C)=C(C(=O)OCC)C1]

Formula 4

EXAMPLE 2-1b (Pd$_3$Cu$_1$@Pt/C (1.0 eq of Pt))

A catalyst was prepared by forming shell layers in the same manner as in Example 2-1a, except that 82.9 mg (1.0 eq of a core) of hexachloroplatinic acid (H$_2$PtCl$_6$.6H$_2$O, alfa aesar) was used as the metal precursor to form shell layers in Example 2-1b.

EXAMPLE 2-1c (Pd$_3$Cu$_1$@Pt/C (0.7 eq of Pt))

Shell layers were formed in the same manner as in Example 2-1a, except that 58.0 mg (0.7 eq of a core) of hexachloroplatinic acid (H$_2$PtCl$_6$.6H$_2$O, alfa aesar) was used as the metal precursor to form shell layers in Example 2-1c.

EXAMPLE 2-2 (Pd@Au@Pt/C)

Shell layers were formed from 93.2 mg (1.1 eq of a core) of hexachloroplatinic acid (H$_2$PtCl$_6$.6H$_2$O, alfa aesar) and 23.6 mg (0.375 eq of a core) of HAuCl$_4$.3H$_2$O, both of which were dissolved in 50 ml of absolute ethanol, in a solution obtained by sufficiently dispersing 50 mg of the core support prepared in Example 1-2 in 150 ml of absolute ethanol. Hanztsch ester (5 eq of a Pt precursor, 1.2 mmol) (Formula 4) dissolved in 20 ml of absolute ethanol was used as the reducing agent. The reaction was performed at a temperature of 80° C. for 2 hours.

Comparing the core-shell structures (FIGS. 4A and 4B) of Comparative Example 2 and Example 2-1a, the metal for forming a shell layer was coated on surfaces of the core particles as well as a region of the support to form shell layers on the whole support when the metal precursor was reduced with ascorbic acid in Comparative Example 2. On the other hand, when the Hanztsch ester of the present invention was used, it was confirmed that the shell layers were selectively formed on the surfaces of the core particles. Therefore, it was revealed that, according to the method of the present invention, the shell layers were selectively formed on the surfaces of the core particles while the core particles were supported in the support.

[Evaluation of Electrochemical Performances]

Preparation of Single Cell

In order to evaluate the performances of electrodes prepared using the catalysts prepared in Examples, cells were manufactured as follows, and evaluated for electrical properties.

Figure 5:
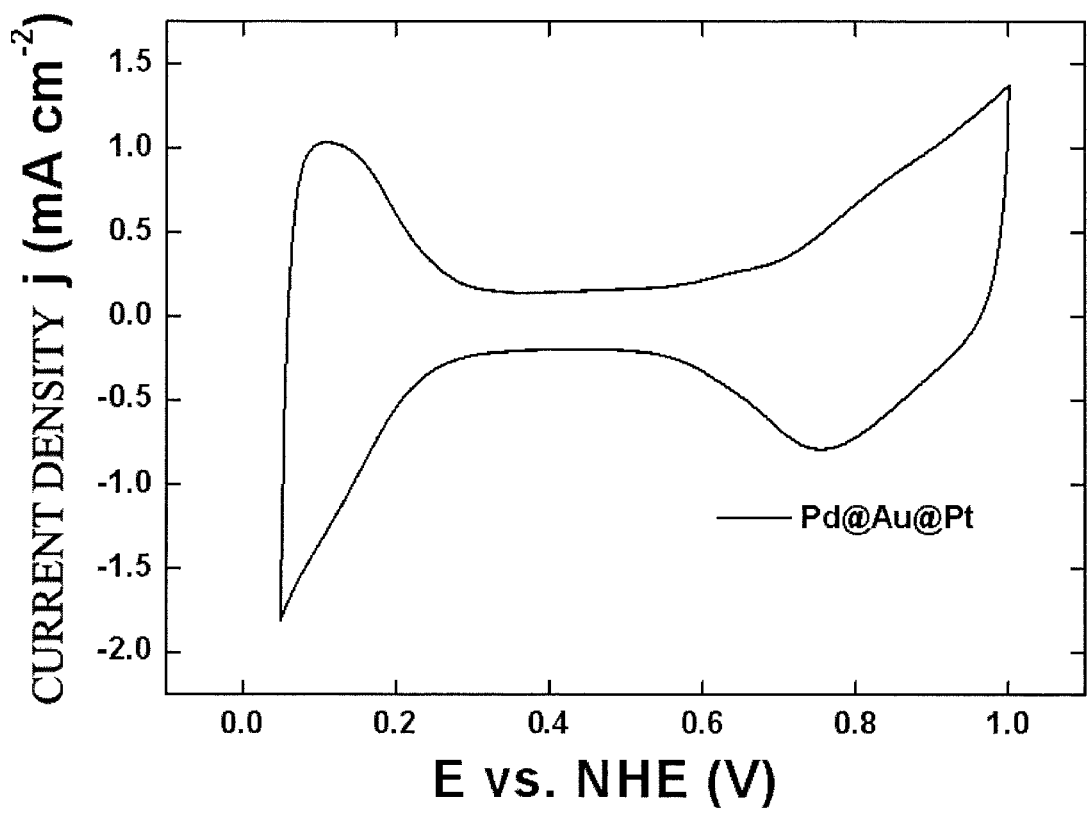
FIG. 5 is a cyclic voltammetry (CV) graph of a catalyst prepared in Example 2-2.

Anode: 0.2 mg/cm$^2$ Pt/C 40 wt % (Johnson-Matthey)
Cathode: 0.3 mg/cm$^2$ Catalysts prepared in Examples 2-1a, 2-1b, 2-1c and 2-2 40 wt %
Cell temperature: 70° C.
Anode line temperature: 75° C.
Cathode line temperature: 70° C.
Humidity: 100%
Activation condition: Activated by load cycling in the presence of oxygen
Anode flow: 150 sccm
Cathode flow: 800 sccm
Active area: 5 cm$^2$
CV Data (FIG. 5)

The catalyst activities were evaluated through cyclic voltammetry (CV) of the catalyst prepared in Example 2-2. The results are shown in FIG. 5. It was seen that Au was not present on the surfaces of the shell layers since a specific peak of Au was not observed. From these facts, it was confirmed that, when the two precursors, Pt and Au, were used at the same time to perform the shell layer-forming reaction, shell layers having a di-layered structure were formed by first reducing Au having a relatively higher reduction potential and then reducing Pt on the Au.

Figure 6:
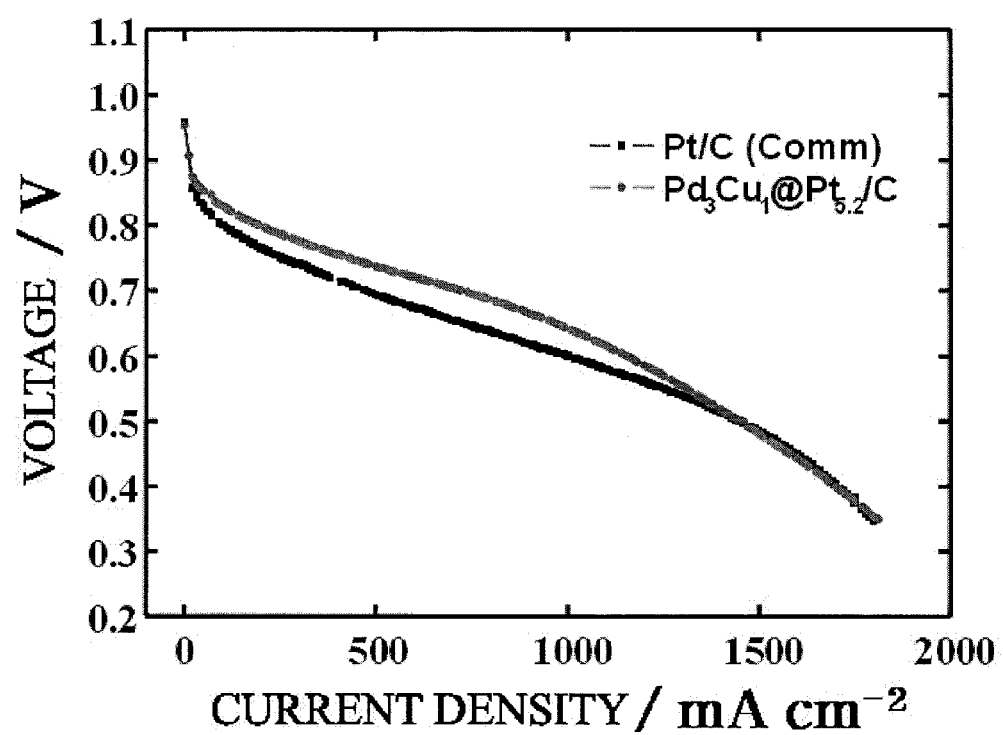
FIG. 6 is a current-voltage (IV) graph of a catalyst prepared in Example 2-1a and a commercially available catalyst.

IV Curve (FIG. 6)

In order to obtain the data for comparison with the catalyst prepared in Example 2-1a, a cell was manufactured in the same manner using 40 wt % Pt/C (Johnson-Matthey), which is a commercially available catalyst, and measured for IV curve. The results are shown in FIG. 6.

Referring to the following Table 1 in which electric currents were measured at 0.6V, 0.7V and 0.8V in each cell, the catalyst prepared in Example 2-1a showed a higher current density than the commercially available catalyst, as measured at the same voltage. That is to say, it was seen that the catalyst of Example 2-1a had a more excellent catalytic activity than the commercially available catalyst.

TABLE 1

|  | Pt/C (JM) | Example 2-1a |
|---|---|---|
| 0.6 V | 1000 mA/cm$^2$ | 1155 mA/cm$^2$ |
| 0.7 V | 462 mA/cm$^2$ | 724 mA/cm$^2$ |
| 0.8 V | 98 mA/cm$^2$ | 197 mA/cm$^2$ |

Evaluation of Oxygen Reduction Reaction (ORR) Activity (1) In order to determine the electrical activity of the catalyst having a core-shell structure according to the present invention per unit area, an ORR was performed using a rotating disc electrode (RDE) device.

The catalysts prepared in Example 2-1a and Example 2-2 were measured for electrical activity, and 40 wt % Pt/C (Johnson-Matthey), which is a commercially available catalyst, was measured as comparison data. The results of both of the catalysts are shown in FIG. 7.

Figure 7:
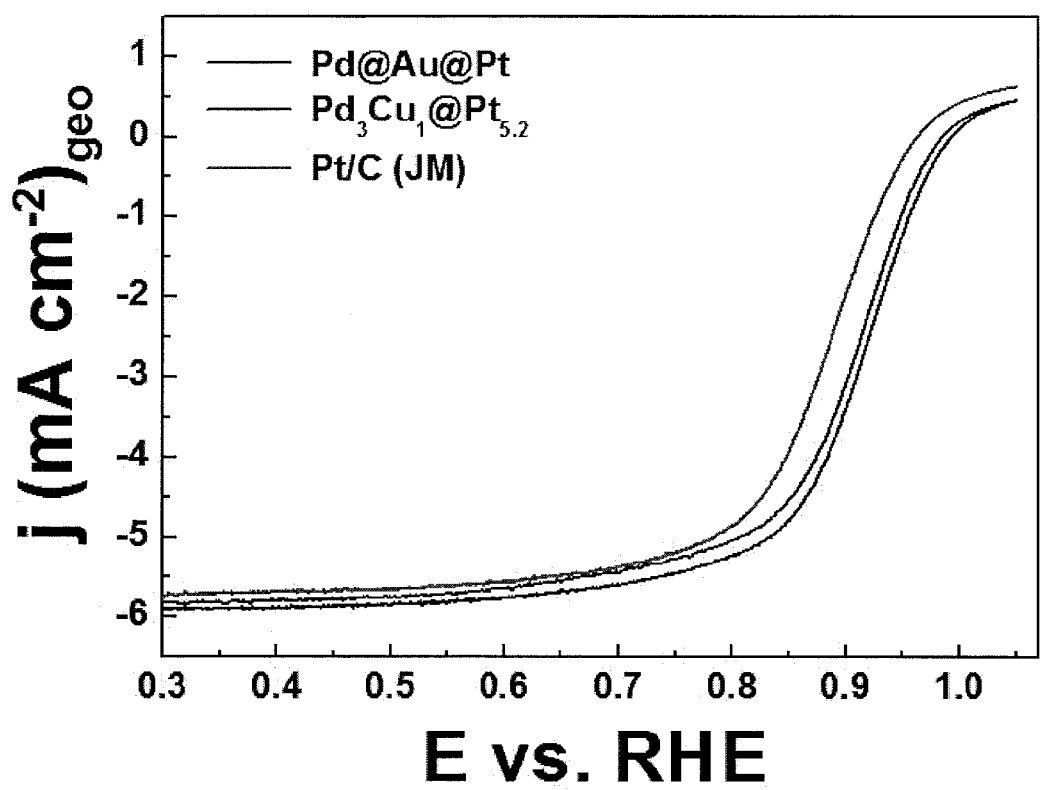
FIG. 7 an oxygen reduction reaction (ORR) graph of catalysts prepared in Examples 2-1a and 2-2 and a commercially available catalyst.

In FIG. 7, the x axis represents a reference voltage of an RHE electrode, and the y axis represents activity j[mA/cm$^2$]$_{geo}$ of an electrode per unit area. A voltage equal to or less than 0.6 V is a diffusion control current, a voltage zone of 0.7 to 0.8 V is a zone in which a kinetic reaction and diffusion are controlled in a mixed state, and the kinetic reaction preferentially takes place at a voltage greater than the voltage zone. Therefore, this indicates that, when the voltage is set to 0.9 V or 0.85 V, the higher the absolute current value is, the faster a speed of the redox reaction is.

Referring to FIG. 7, the PdCu@Pt and PdCu@Pt@Au catalysts prepared respectively in Example 2-1a and Example 2-2 had a current density of 3.6 mA/cm$^2$ at 0.9 V with respect to the RHE electrodes. This indicates that the catalysts of Example 2-1a and Example 2-2 showed ORR activities higher than 1.9 times the 40 wt % Pt/C (Johnson-Matthey) that is commercially available as a catalyst.

Figure 8:
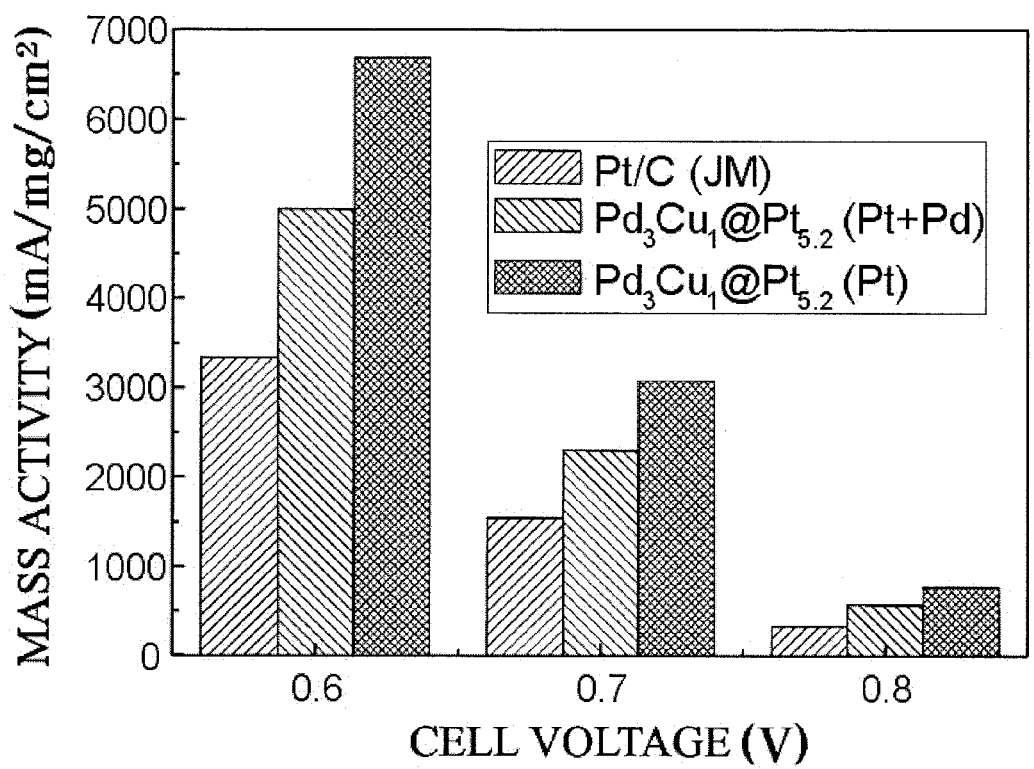
FIG. 8 is a graph showing the catalytic activity of a catalyst prepared in Example 2-1a per unit mass.

Meanwhile, FIG. 8 shows values obtained by dividing current densities at certain voltages (0.6V, 0.7V and 0.8V) by a mass of Pt or Pt+Pd so as to evaluate the catalytic activities of the catalyst of Example 2-1a and the commercially available catalyst per unit mass. From these facts, it was confirmed that an amount of Pt was increased 2 times or more, and amounts of Pt and Pd were increased approximately 1.4 times. That is to say, it was confirmed that the catalytic activities of the metals used in the present invention were highly improved, compared to those of conventional metals.

Figure 9:
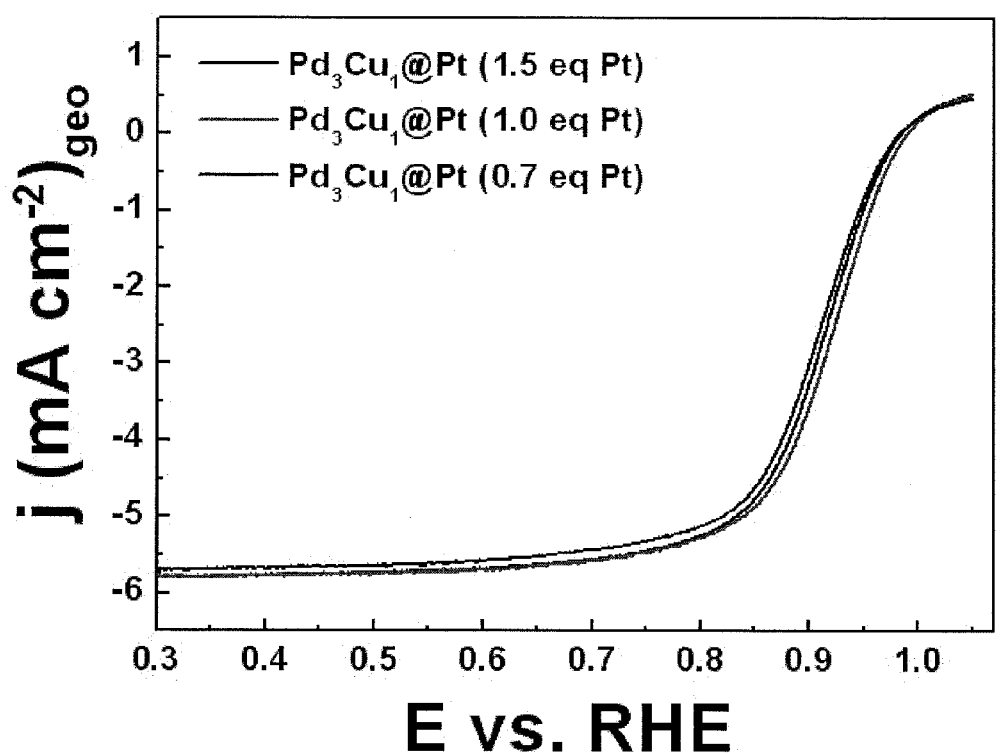
FIG. 9 is an ORR graph of catalysts prepared in Examples 2-1a, 2-1b and 2-1c.

(2) Next, the catalysts prepared in Example 2-1a, 2-1b and 2-1c of the present invention were measured for electrical activity per unit area. The results are shown in FIG. 9. From these facts, it was confirmed that when an amount of the metal used to form a shell layer was 1.0 equivalent, a half wave potential was increased by 10 mV, compared to when the amount of the metal was 1.5 equivalent, and increased by 5 mV, compared to when the amount of the metal was 0.7 equivalent. This is considered to be due to the slight degradation of the catalyst performances caused when the Pt for forming a shell layer shows a bulk property when Pt, as the metal for forming a shell layer, was used at an excessive amount of 1.5 equivalent, whereas the Pt did not sufficiently surround the core particles when the Pt was used at an amount of 0.7 equivalent. From these facts, it was seen that the catalysts having a core-shell structure and showing desirable catalyst activity were prepared by controlling an amount of the metal for forming a shell layer according to the present invention.

Meanwhile, the catalysts prepared in Example 2-1a, 2-1b and 2-1c were compared to a variety of commercially available catalysts. The results are listed in the following Table 2. The term "$E_{1/2}$" refers to an electric potential value obtained when current density is half the limiting current in the ORR graph. Here, a higher $E_{1/2}$ value means that an over-potential is slightly applied in the ORR reaction. That is to say, the catalysts of Examples 2-1a, 2-1b and 2-1c were catalysts having good activities in the oxygen reduction reaction. From these facts, it was confirmed that the catalysts according to the present invention showed much more excellent performances, compared to the commercially available catalysts.

TABLE 2

| Catalyst | Manufacturer | $E_{1/2}$ (V vs. RHE) (the higher, the better) | I (mA/cm$^2$)@0.9 V (the higher, the better) |
|---|---|---|---|
| PtNi/C | Argonne | 0.93 | — |
| PtML/Pd$_2$Au$_1$Ni$_1$ | Los Alamos | 0.87 | 2.0 |
| Pt on Pd nanorod | Brookhaven | 0.90 | 3.2 |
| Example 2-1a | KIST | 0.92 | 3.1 |
| Example 2-1b | KIST | 0.925 | 3.3 |
| Example 2-1c | KIST | 0.93 | 3.6 |

Stability Test

The catalyst prepared in Example 2-1a was evaluated for catalytic stability. This stability test was performed at 400 mA/cm$^2$ under the condition of Air on (10 min)/off(5 sec) mode, periodic N$_2$ purge to eliminate flooding-based recoverable damage effect.

Figure 10:
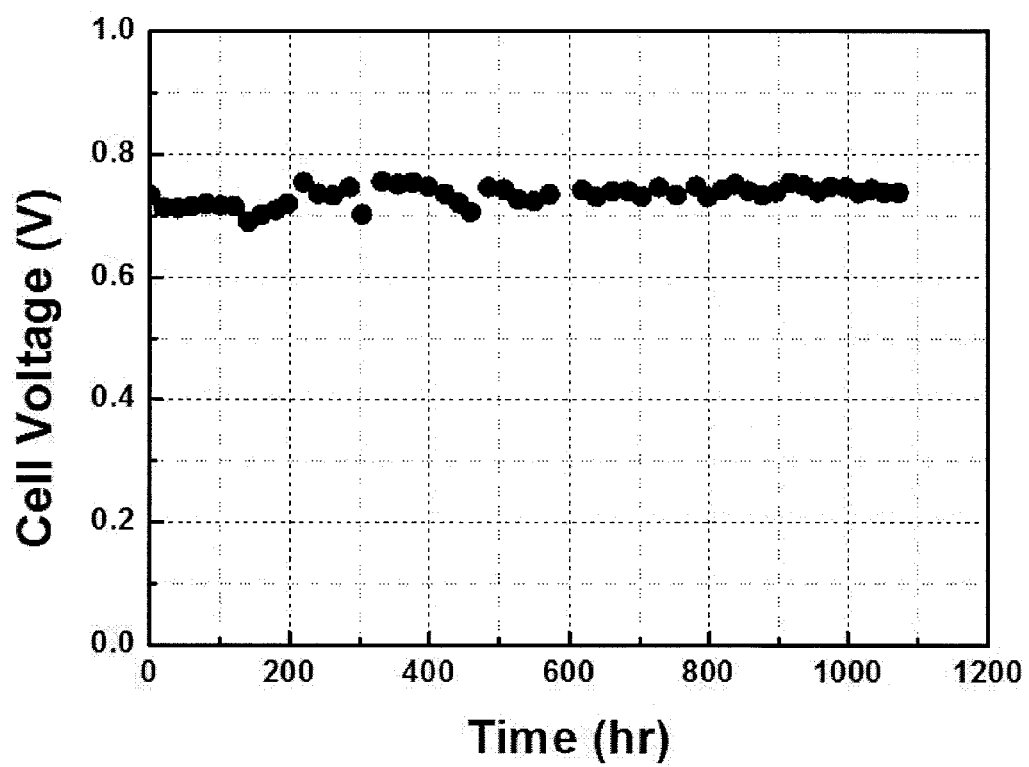
FIG. 10 is graph showing the result obtained by subjecting a catalyst prepared in Example 2-1a to a stability test.

FIG. 10 graph shows that the cell voltage is still hold after working through 1000 hours without degradation. It was seen that a catalyst of Example 2-1a has long period stability.

According to the present invention, a subsequent process such as heat treatment or chemical treatment, which would be performed to remove a stabilizer after formation of a core and a shell layer, is not required in the preparation of electrocatalysts having a core-shell structure. This is advantageous in processes, and is also able to prevent cohesion between core particles and deformation of the core particles, which are caused when the core particles supported in the support are subjected to heat treatment or chemical treatment. It is also possible to prevent deformation of a core-shell structure and thus degradation of the catalytic activity and electrochemical properties after the formation of shell layers. According to the present invention, core particles having a uniform nanosize diameter may be supported in a support, and shell layers may be selectively formed on surfaces of the core particles supported in the support. Therefore, according to the present invention, it is possible to prepare an electrocatalyst for fuel cells in a core-shell structure in which shell layers are selectively and homogeneously formed only on surfaces of the nanosize core particles supported in the support to have a uniform particle size. Accordingly, the electrocatalyst may be used for both an anode and a cathode of a fuel cell, and shows a high catalyst-supporting amount and excellent catalyst activity and electrochemical properties.

It will be apparent to those skilled in the art that various modifications can be made to the above-described exemplary embodiments of the present invention without departing from the scope of the invention. Thus, it is intended that the present invention covers all such modifications provided they come within the scope of the appended claims and their equivalents.

What is claimed is:

1. A method of preparing an electrocatalyst for fuel cells, the method comprising:
   preparing a core support in which core particles having a nanosize diameter are supported through out a support by a reaction of the support and metal precursors for forming core particles in an ether-based solvent; and
   selectively forming shell layers on surfaces of the core particles by a reaction of the core support and metal precursors for forming shell layers in the presence of a Hanztsch ester-based reducing agent, wherein the Hanztsch ester-based reducing agent comprising formula (3)

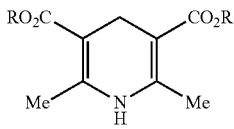

(3)

wherein R is an alkyl group haying 1 to 4 carbons.

2. The method according to claim 1, wherein an amine-based reducing agent is further used in the preparation of the core support.

3. The method according to claim 1, wherein the metal precursors for forming core particles are metal compounds comprising at least one selected from the group consisting of palladium, copper, gold and iridium.

4. The method according to claim 3, wherein the metal compound is metal acetylacetonate.

5. The method according to claim 1, wherein the metal precursors for forming shell layers comprise at least one selected from the group consisting of platinum, iridium and gold.

6. The method according to claim 5, wherein the metal precursor is hexachloroplatinic acid.

7. The method according to claim 1, wherein the ether-based solvent is benzyl ether.

8. The method according to claim 1, wherein the Hanztsch ester-based reducing agent comprises formula (4)

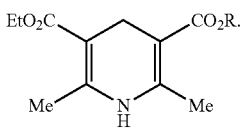

(4)

9. A method of preparing an electrocatalyst for fuel cells, the method comprising:
  reducing a core metal salt onto a support to form core particles onto a support; and
  forming a shell onto the core particles by reducing a shell metal salt with a Hanztsch ester-based reducing agent comprising formula (3)

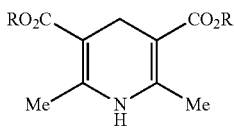

(3)

wherein R is an alkyl group having 1 to 4 carbons.

10. The method of claim 9, wherein the support comprises a carbon support.

11. The method of claim 10, wherein the carbon support is at least one selected from the group consisting of activated carbon and carbon black.

12. The method of claim 9, wherein the core metal salt comprises at least one metal element selected from the group consisting of ruthenium, rhodium, palladium, gold, silver, iridium, copper, nickel, iron, osmium, and platinum.

13. The method of claim 9, wherein the core metal salt comprises metal acetylacetonate salts selected from the group consisting of palladium, copper, gold and iridium.

14. The method of claim 9, wherein the core metal salt comprises palladium(II) acetylacetonate and copper(II) acetylacetonate.

15. The method of claim 9, wherein the shell metal salt comprises at least one metal element selected from the group consisting of ruthenium, rhodium, palladium, gold, silver, iridium, copper, nickel, iron, osmium, and platinum.

16. The method of claim 9, wherein the Hanztsch ester-based reducing agent comprises formula (4)

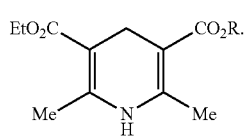

(4)

17. A method of preparing an electrocatalyst for fuel cells, the method comprising:
  reducing a core metal salt to form core particles onto a support by using t-butylamine borane as a reducing agent in a benzyl ether solvent, wherein the core metal salt comprises palladium(II) acetylacetonate and copper (II) acetylacetonate, wherein the core particles are homogeneously supported on the support and are uniform sized nanoparticles; and
  forming a shell onto the core particles by reducing a shell metal salt with a Hanztsch ester-based reducing agent comprising formula (3)

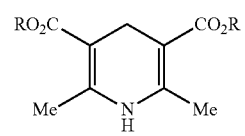

(3)

wherein R is an alkyl group having 1 to 4 carbons.

18. The method of claim 17, wherein the Hanztsch ester-based reducing agent comprises formula (4)

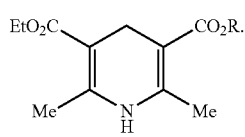

(4)

19. The electrocatalyst according to claim 17, wherein the metal precursors for shell layers comprise at least one selected from the group consisting of platinum, iridium and gold.

* * * * *